(12) United States Patent
Tsai

(10) Patent No.: US 6,285,160 B1
(45) Date of Patent: Sep. 4, 2001

(54) RETAINING DEVICE OF BATTERY SET OF SCOOTER

(76) Inventor: Shui-Te Tsai, No. 12, Lane 441, Pu Na Street, Chang Hua (TW)

( * ) Notice: Subject to any disclaimer, the term of this patent is extended or adjusted under 35 U.S.C. 154(b) by 0 days.

(21) Appl. No.: 09/729,225

(22) Filed: Dec. 5, 2000

(51) Int. Cl.[7] ................. H02J 7/00; H01M 2/10; B60R 16/04
(52) U.S. Cl. ................. 320/112; 429/96; 429/100; 180/68.5
(58) Field of Search ................. 320/112; 429/96, 429/97, 99, 100; 180/68.5

(56) References Cited

U.S. PATENT DOCUMENTS 5,613,569 * 3/1997 Sugioka et al. ............... 180/68.5
5,775,452 * 7/1998 Patmont ........................ 180/181

* cited by examiner

*Primary Examiner*—Peter S. Wong
*Assistant Examiner*—Gregory J. Toatley, Jr.
(74) *Attorney, Agent, or Firm*—Browdy and Neimark

(57) ABSTRACT

A scooter has a battery set retaining device which comprises a support frame fastened with the scooter. The support frame is formed of a support portion, an insertion portion, and a retaining portion. The insertion portion is provided with a hanging portion to which a retaining member is pivoted. The battery set is retained by the hanging portion which is engaged with the insertion portion of the support frame. The retaining portion of the retaining member is capable of engaging and disengaging the retaining portion of the support frame.

12 Claims, 6 Drawing Sheets

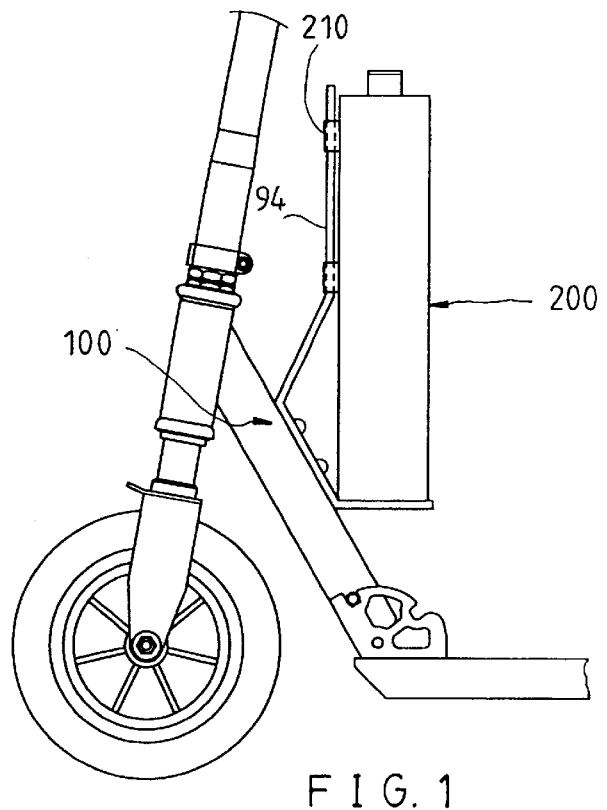
F I G. 1
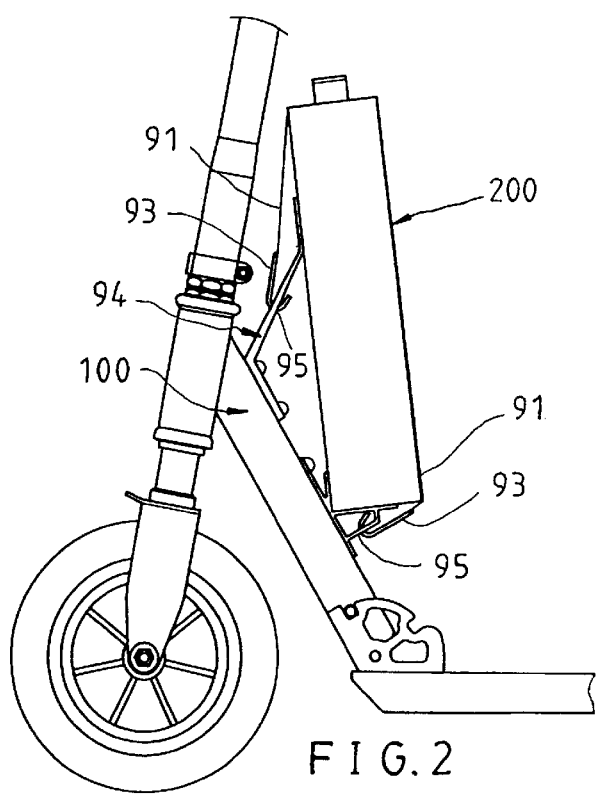
F I G. 2

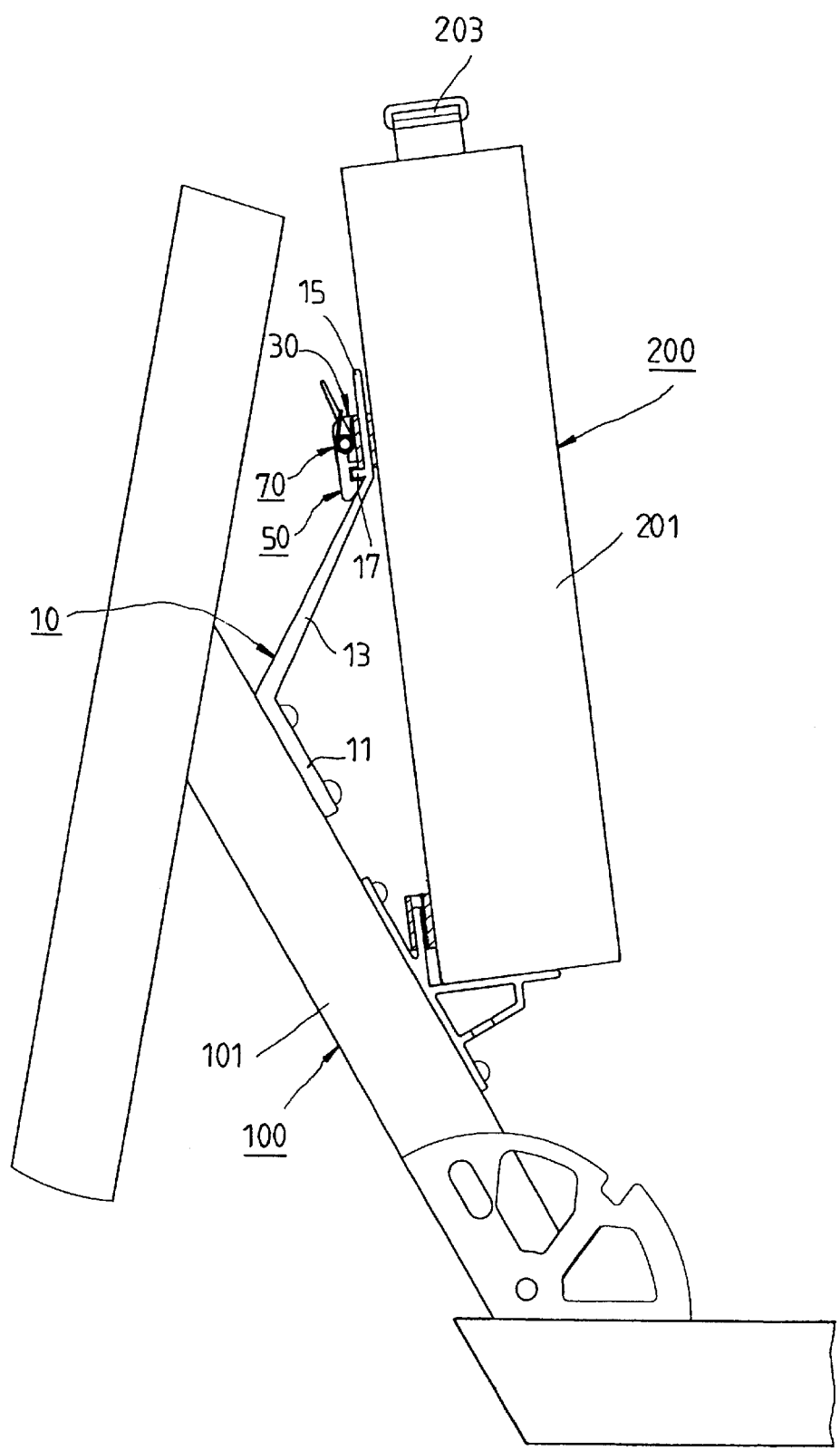
F I G. 3

RETAINING DEVICE OF BATTERY SET OF SCOOTER

FIELD OF THE INVENTION

The present invention relates generally to a battery set of the scooter, and more particularly to a device for retaining the battery set of the scooter.

BACKGROUND OF THE INVENTION

As shown in FIG. 1, the conventional battery set 200 of the scooter is retained on a folding device 100 by means of two lugs 210, which are retained by a support frame 94. The support frame 94 is fastened with the folding device 100. The battery set 200 is susceptible to being detached from the support frame 94.

As shown in FIG. 2, the conventional battery set 200 is retained by a support frame 94 in such a manner that the eyes 95 of the support frame 94 catch the hooks 93 which are fastened with the lashing straps 91. The battery set 200 can not be handily detached to facilitate the replacing of batteries. In addition, such a retaining means as described above undermines the over-all esthetic effect of the scooter.

SUMMARY OF THE INVENTION

The primary objective of the present invention is to provide a scooter with a battery set retaining device which is free of the shortcomings of the conventional battery set retaining devices described above.

The battery set retaining device of the present invention comprises a support frame which is fastened with the frame of a scooter and is formed of a support portion, an insertion portion, and a retaining portion. The insertion portion is provided with a hanging portion to which a retaining member is pivoted. The battery set is retained by the hanging portion which is engaged with the insertion portion of the support frame. The retaining portion of the retaining member is capable of engaging or disengaging the retaining portion of the support frame.

BRIEF DESCRIPTION OF THE DRAWINGS

FIG. 1 shows a schematic plan view of a prior art electric scooter.

FIG. 2 shows a schematic plan view of another prior art electric scooter.

FIG. 3 shows a schematic plan view of a preferred embodiment of the present invention in use.

DETAILED DESCRIPTION OF THE INVENTION

As shown in FIG. 3, a battery set 200 retaining device of the present invention is fastened with a folding device 100 of an electric scooter.

The battery set 200 has a container 201 for housing batteries, and a handle 203 to facilitate the carrying of the battery set 200.

Figure 4:
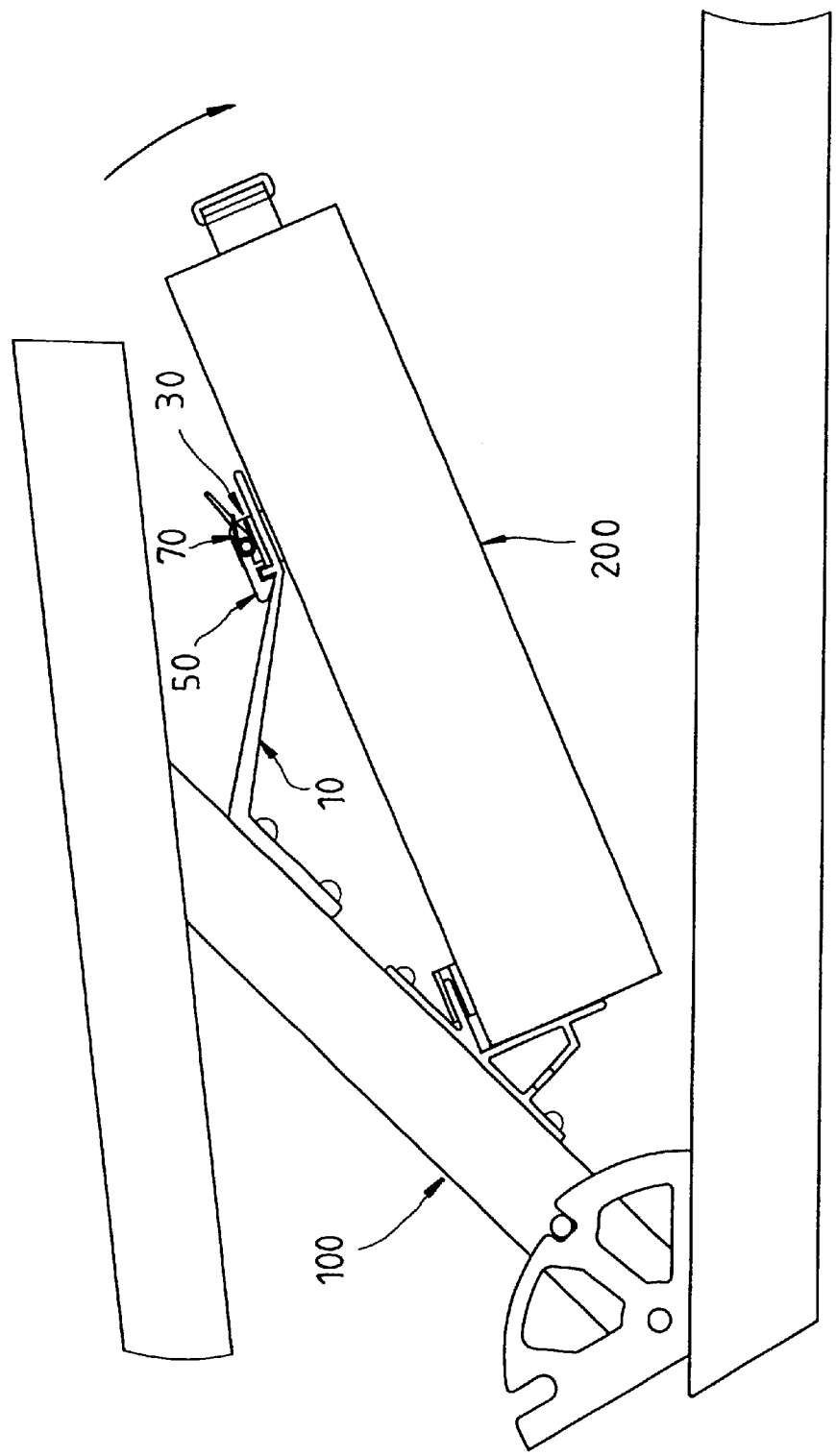
FIG. 4 shows a schematic view of the preferred embodiment of the present invention in the folding state.
Figure 5:
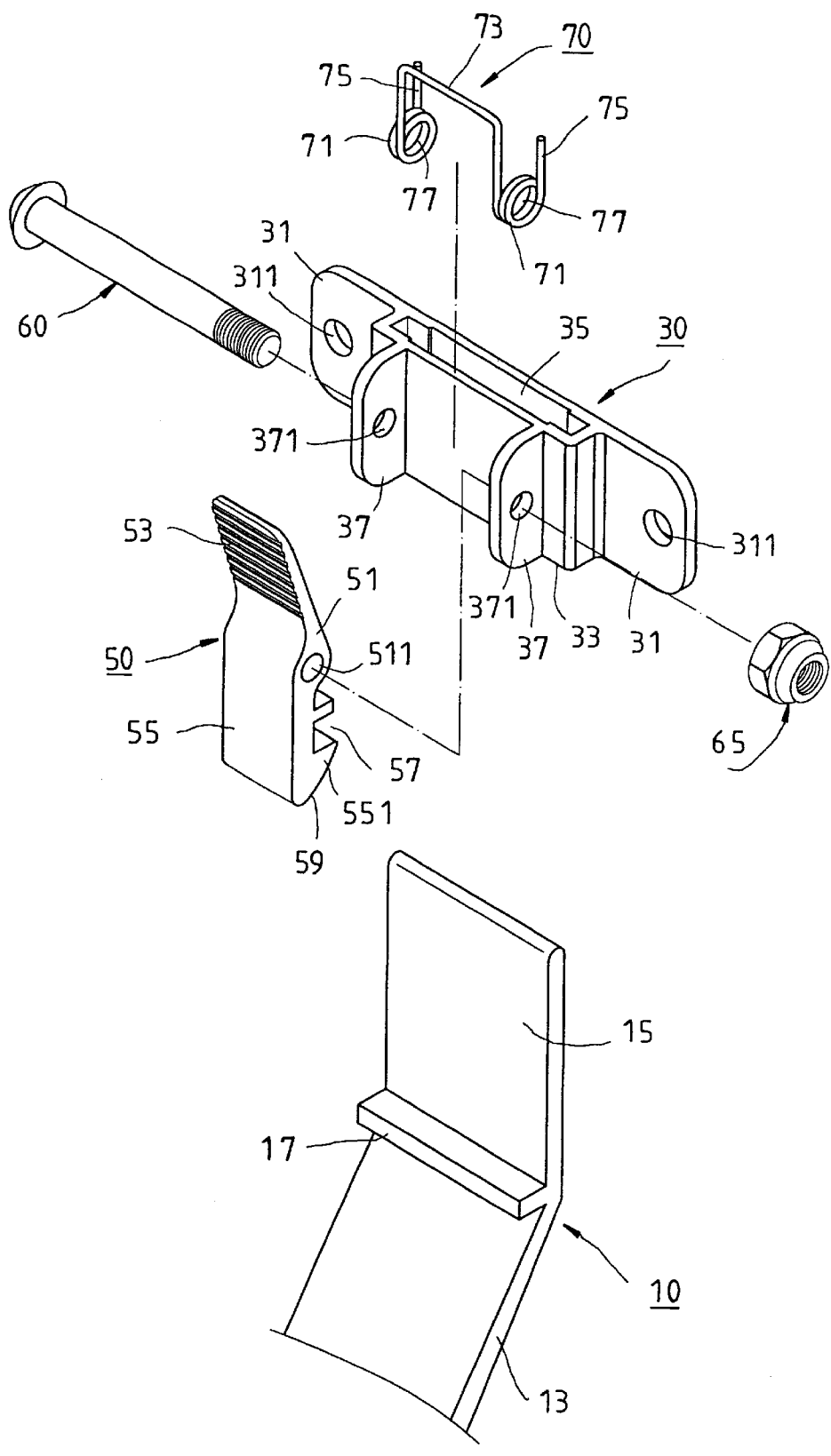
FIG. 5 shows an exploded view of the preferred embodiment of the present invention.

As shown in FIGS. 3–5, the retaining device of the present invention comprises the component parts which are described hereinafter.

A support frame 10 is fastened with a folding rod 101 of the folding device 100 of the electric scooter and is formed of a fastening portion 11, a support portion 13 extending upwards and having a predetermined length, a flat insertion portion 15, and a retaining portion 17 of a protruded construction and located under the insertion portion 15.

A hanging seat 30 is fastened with one side of the battery set 200 and is provided with two fastening lugs 31, with each having a fastening hole 311 for fastening the container 201 of the battery set 200 by riveting. A long frame portion 33 is provided with a hanging hole 35 of a rectangular construction for holding the insertion portion 15 of the support frame 10. The hanging hole 35 has a midsegment greater in hole diameter to reduce friction. Two pivoting lugs 37 are disposed in other side opposite to the battery set 200. The pivoting lugs 37 are provided with a coaxial pivoting hole 371.

A retaining member 50 has a pivoting portion 51 which is provided with a pivoting hole 511 for receiving a pivot 60, which is engaged with a nut 65 via the pivoting holes 371 of the hanging seat 30. A wrenching portion 53 is provided with a plurality of grains, a retaining rod 55 having a retaining portion 551 of a hooked construction, thereby forming a retaining groove 57 for retaining the retaining portion 17 of the support frame 10. An arcuate surface 59 is formed to facilitate the swinging.

A torsion spring 70 is provided with two circle portions 71, each having a fitting hole 77, a middle press portion 73, and two side press portions 75. The pivot 60 is put through the fitting holes 77 of the circle portions 71.

As shown in FIG. 4, the battery set 200 is mounted on the support frame 10 such that the battery set 200 is located in a receiving space at the time when the scooter is folded.

Figure 6:
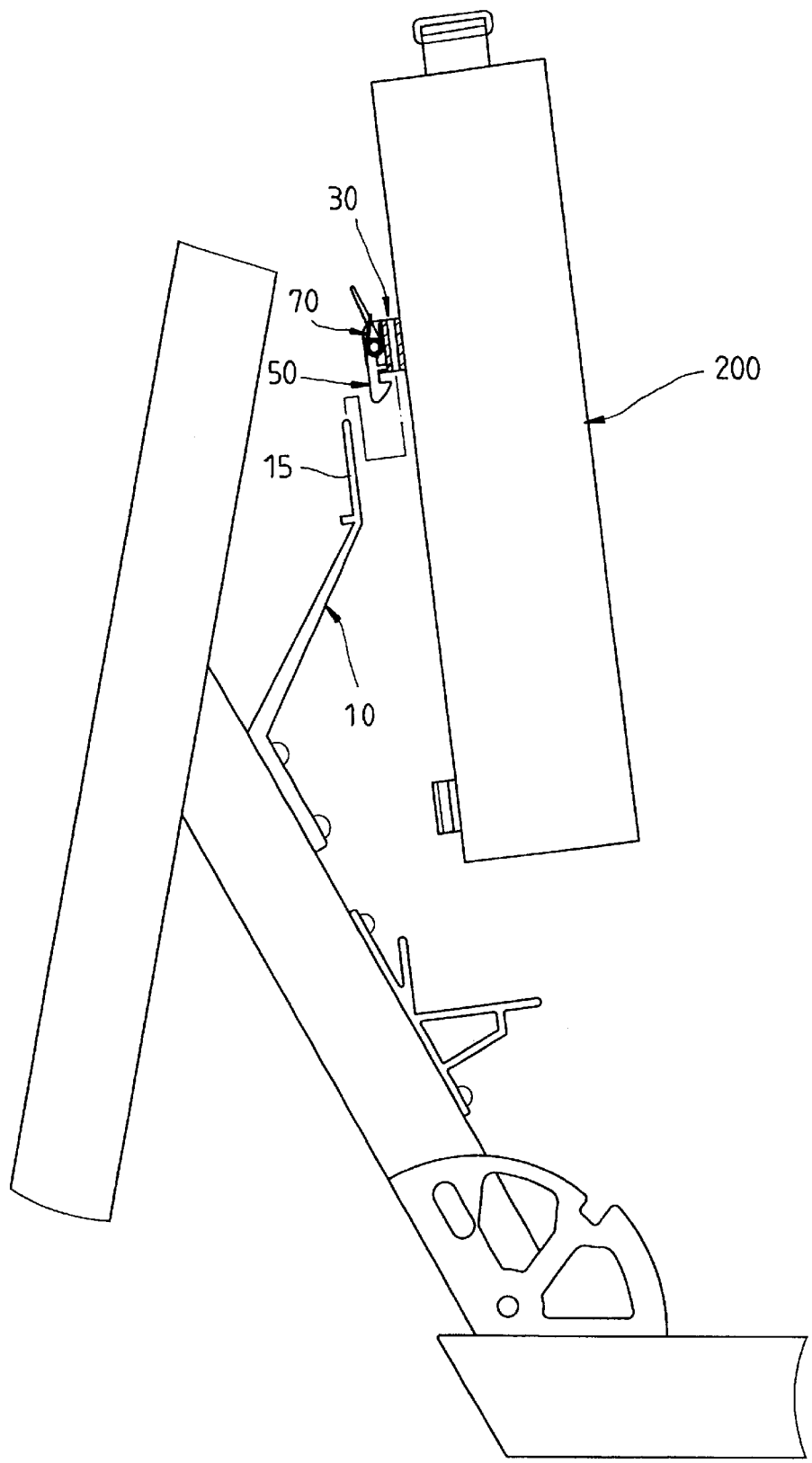
FIG. 6 shows a schematic view of the detached battery set of the preferred embodiment of the present invention.

As shown in FIG. 6, the battery set 200 is mounted on the scooter such that the hanging hole 35 of the hanging seat 30, which is fastened with the battery set 20, is engaged with the insertion portion 15 of the support frame 10.

Figure 7:
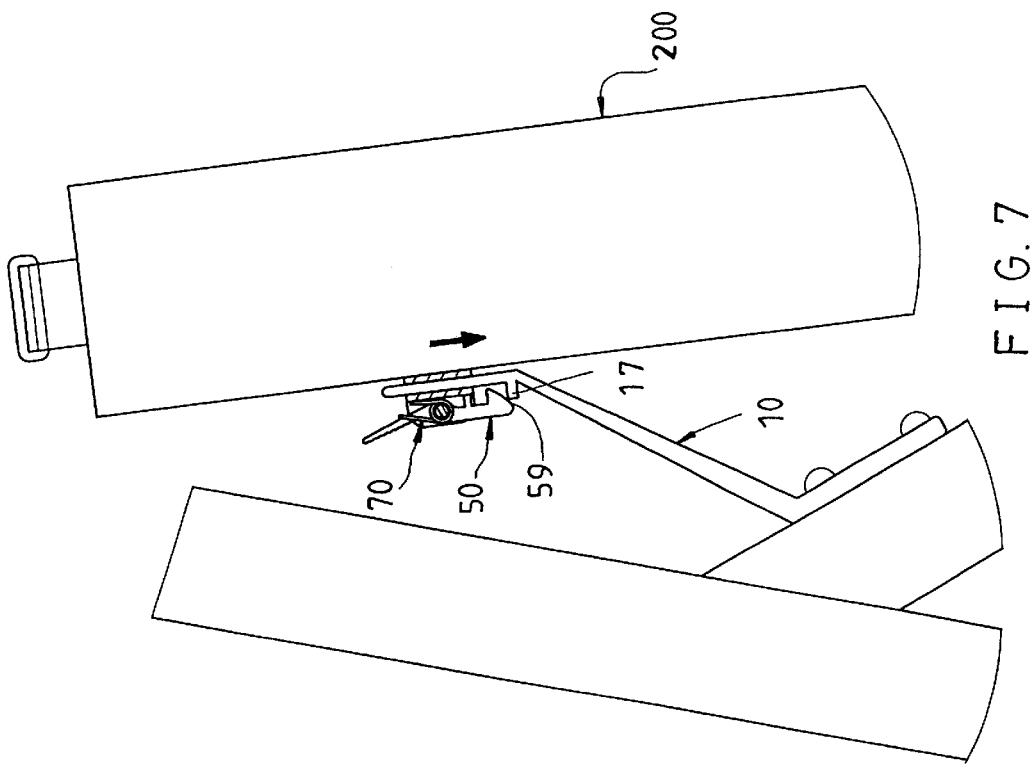
FIG. 7 shows a schematic view of the retained battery set of the preferred embodiment of the present invention.

As shown in FIG. 7, the arcuate surface 59 of the retaining member 50 is urged by the retaining portion 17 of the support frame 10 to overcome the spring force of the torsion spring 70. The retaining portion 17 of the support frame 10 is retained in the retaining groove 57 of the retaining member 50. The battery set 200 is thus fixed, as shown in FIG. 3.

Figure 8:
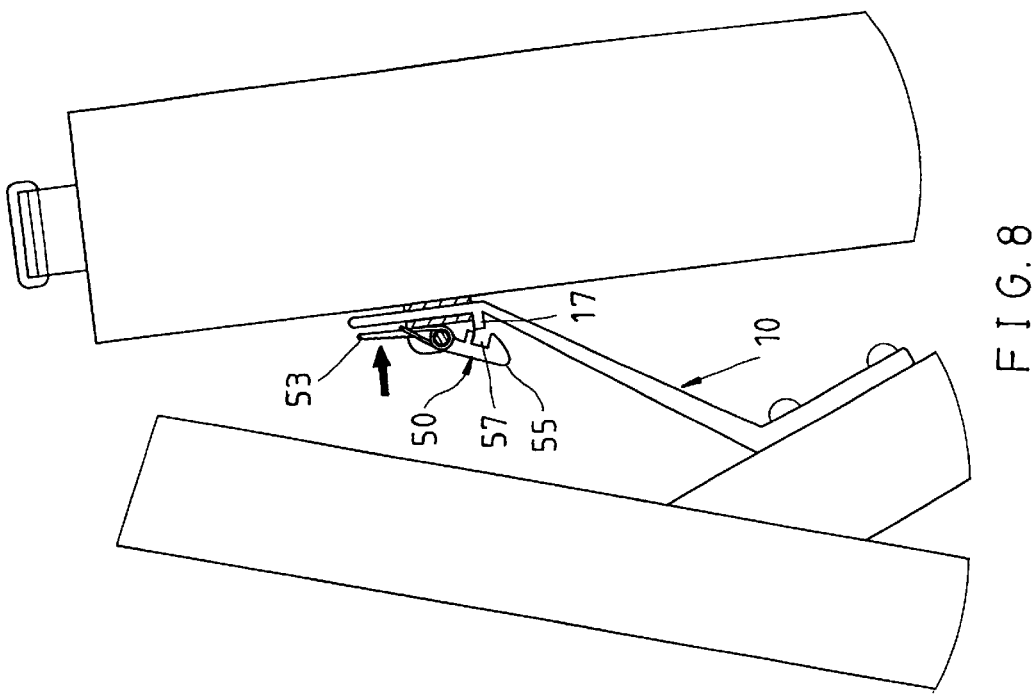
FIG. 8 shows a schematic view of the retaining member of the preferred embodiment of the present invention in action.

When the battery set 200 is removed from the scooter, the wrenching portion 53 of the retaining member 50 is first wrenched with finger in the direction toward the battery set 200, so as to overcome the torsion force of the torsion spring 70. As a result, the retaining rod 55 can be swiveled such that the retaining groove 57 moves away from the retaining portion 17 of the hanging seat 30, as shown in FIG. 8.

The battery set 200 can be lifted with hand holding the handle 203 such that the hanging hole 35 of the hanging seat 30 moves away from the insertion portion 15 of the support frame 10, as shown in FIG. 6. The battery set 200 is thus removed from the scooter.

What is claimed is:

1. A device for retaining a battery set of an electric scooter, said device comprising:

a support frame mounted on a predetermined portion of the scooter and formed of a support portion, an insertion portion extending from said support portion, and a retaining portion;

a hanging seat fastened with one side of the battery set and provided with a hanging portion which is disposed on said insertion portion of said support frame;

a retaining member pivoted to said hanging seat and provided with a wrenching portion and a retaining portion corresponding to said retaining portion of said support frame;

said hanging portion of said hanging seat being engaged with said insertion portion of said support frame for holding the battery set, said retaining portion of said retaining member being capable of retaining or moving away from said retaining portion of said support frame.

2. The device as defined in claim 1, wherein said retaining member is provided with a spring force by an elastic member.

3. The device as defined in claim 2, wherein said elastic member is a torsion spring.

4. The device as defined in claim 1, wherein said retaining portion of said support frame is of a protruded construction.

5. The device as defined in claim 1, wherein said retaining portion of said retaining member is of a hooked construction.

6. The device as defined in claim 1, wherein said retaining member is provided with a retaining groove for retaining said retaining portion of said support frame.

7. The device as defined in claim 1, wherein said retaining portion of said retaining member is provided at the front end with an arcuate surface to be retained by said retaining portion of said support frame.

8. The device as defined in claim 1, wherein said wrenching portion of said retaining member is provided in the surface with a plurality of grains.

9. The device as defined in claim 1, wherein said hanging seat is provided with two lugs for connecting the battery set.

10. The device as defined in claim 1, wherein said hanging seat is provided with two pivoting lugs for pivoting said retaining member.

11. The device as defined in claim 1, wherein said hanging hole of said hanging seat is rectangular in shape.

12. The device as defined in claim 1, wherein said hanging hole of said hanging seat has a midsegment greater in hole diameter.

* * * * *